United States Patent
Mizuno et al.

(10) Patent No.: US 8,346,066 B2
(45) Date of Patent: Jan. 1, 2013

(54) MOVING IMAGE REPRODUCING APPARATUS AND MOVING IMAGE SHOOTING APPARATUS

(75) Inventors: Kimiyasu Mizuno, Akishima (JP); Jun Muraki, Hamura (JP); Koki Dobashi, Musashino (JP)

(73) Assignee: Casio Computer Co., Ltd, Tokyo (JP)

( * ) Notice: Subject to any disclaimer, the term of this patent is extended or adjusted under 35 U.S.C. 154(b) by 691 days.

(21) Appl. No.: 12/510,585

(22) Filed: Jul. 28, 2009

(65) Prior Publication Data

US 2010/0040344 A1 Feb. 18, 2010

(30) Foreign Application Priority Data

Aug. 13, 2008 (JP) ................................. 2008-208390

(51) Int. Cl.
*H04N 5/783* (2006.01)
*H04N 5/93* (2006.01)

(52) U.S. Cl. ........................................ 386/343; 386/353

(58) Field of Classification Search ........................ None
See application file for complete search history.

(56) References Cited

U.S. PATENT DOCUMENTS

| | | | |
|---|---|---|---|
| 7,453,519 B2 * | 11/2008 | Kubota et al. | 348/459 |
| 7,860,321 B2 * | 12/2010 | Watanabe et al. | 382/232 |
| 2004/0081437 A1 | 4/2004 | Asada et al. | |
| 2008/0068485 A1 | 3/2008 | Yuyama | |

FOREIGN PATENT DOCUMENTS

| | | |
|---|---|---|
| CN | 1577877 A | 2/2005 |
| CN | 1600027 A | 3/2005 |
| CN | 101090459 A | 12/2007 |
| JP | 2006-033242 | 2/2006 |
| JP | 2006-157153 | 6/2006 |
| JP | 2007-116418 | 5/2007 |
| JP | 2008-182683 | 8/2008 |

OTHER PUBLICATIONS

Chinese Office Action for Chinese Application No. 200910166077.5 Issued on Nov. 4, 2010.
Chinese Office Action for Chinese Application No. 200910166077.5 mailed on Jun. 9, 2011.
Japanese Office Action for Japanese Application No. 2008-208390 mailed on Jan. 24, 2012.

* cited by examiner

*Primary Examiner* — William C Vaughn, Jr.
*Assistant Examiner* — Asher Khan
(74) *Attorney, Agent, or Firm* — Turocy & Watson, LLP

(57) ABSTRACT

An image pick-up apparatus is provided, which is provided with a recording medium, a image processing unit, a display, and a controlling unit. The recording medium stores plural continuous image frames of one scene. The image processing unit adds and combines a predetermined number of image frames among the plural image frames stored in the recording medium to successively produce image frames H for reproduction. The display switches the image frames for reproduction at a reproducing frame rate to reproduce a moving image. The controlling unit sets the number of image frames to be added and combined by the image processing unit in accordance with a reproducing speed of the moving image, whereby the moving image is reproduced with noises reduced at various reproducing speeds.

12 Claims, 16 Drawing Sheets

100

OBJECT BRIGHTNESS IS INCREASED,
BUT NOISE COMPONENT IS ALSO
INCREASED AND S/N RATIO IS NOT
IMPROVED

MOVING IMAGE REPRODUCING APPARATUS AND MOVING IMAGE SHOOTING APPARATUS

BACKGROUND OF THE INVENTION

1. Field of the Invention

The present invention relates to an image reproducing apparatus with a function of reproducing a moving image, an image pick-up apparatus with a function of shooting and reproducing a moving image, a controlling method of the image reproducing apparatus and the image pick-up apparatus, and a control program for controlling the image reproducing apparatus and the image pick-up apparatus.

2. Description of the Related Art

A digital camera is known, which shoots one scene at a shooting frame rate, for example, at 30 fps. or at 6 fps. to produce plural continuous image frames, and switches the plural produced image frames at a reproducing frame rate to reproduce a moving image.

In recent, a digital camera has been developed, which is capable of shooting a moving image at a shooting frame rate (for example, at 240 fps.) higher than conventional frame rate. When the image shot with such digital camera is reproduced in slow motion, an ultra slow motion reproduction can be realized with a temporal resolution higher than conventional digital cameras.

Japanese Patent 2002-320203 A discloses a recording and reproducing apparatus, which controls a reproducing frame rate and/or reproducing speed during a moving image reproducing operation to obtain slow motion effect and high speed motion effect.

At the higher shooting frame rate a moving image is shot, the shorter an exposure time per image frame becomes. When the reproducing speed of a moving image is changed, even though image frames are reproduced at a reproducing frame rate equivalent to a predetermined shooting frame rate multiplied by a coefficient corresponding to a reproducing speed, a problem is raised that requires an intensifying process in a high speed frame rate shooting operation, resulting in easily involving noise components in a video signal.

SUMMARY OF THE INVENTION

According to one aspect of the invention, there is provided a moving image reproducing apparatus, which comprises a storing unit for storing plural continuous image frames concerning one scene, a frame producing unit for adding and combining a predetermined number of image frames among the plural image frames stored in the storing unit to successively produce image frames for reproduction, a reproducing unit for switching at a predetermined reproducing frame rate the image frames for reproduction successively produced by the frame producing unit, thereby reproducing a moving image, a speed specifying unit for specifying a reproducing speed at which the reproducing unit reproduces the moving image, and a frame number setting unit for setting the number of image frames to be added and combined by the frame producing unit in accordance with the reproducing speed specified by the speed specifying unit.

According to another aspect of the invention, there is provided an image pick-up apparatus, which comprises an image pick-up unit for shooting one scene at a shooting frame rate, thereby producing plural continuous image frames, a storing unit for storing the plural image frames produced by the image pick-up unit, a frame producing unit for adding and combining a predetermined number of image frames among the plural image frames stored in the storing unit to successively produce image frames for reproduction, a reproducing unit for switching at a predetermined reproducing frame rate the image frames for reproduction successively produced by the frame producing unit, thereby reproducing a moving image, a speed specifying unit for specifying a reproducing speed at which the moving image is reproduced by the reproducing unit, and a frame number setting unit for setting the number of image frames to be added and combined by the frame producing unit in accordance with the reproducing speed specified by speed specifying unit.

According to other aspect of the invention, there is provided a computer readable recording medium to be mounted on a moving image reproducing apparatus provided with a computer and a storing unit storing plural continuous image frames concerning one scene, the recording medium having recorded thereon a computer program when executed to make the computer function as means which comprises frame producing means for adding and combining a predetermined number of image frames among the plural image frames stored in the storing unit to successively produce image frames for reproduction, reproducing means for switching at a predetermined reproducing frame rate the image frames for reproduction successively produced by the frame producing means to reproduce a moving image, and frame number setting means for setting the number of image frames to be added and combined by the frame producing means in accordance with a reproducing speed at which the moving image is reproduced by the reproducing means.

DETAILED DESCRIPTION OF THE PREFERRED EMBODIMENTS

Figure 1:
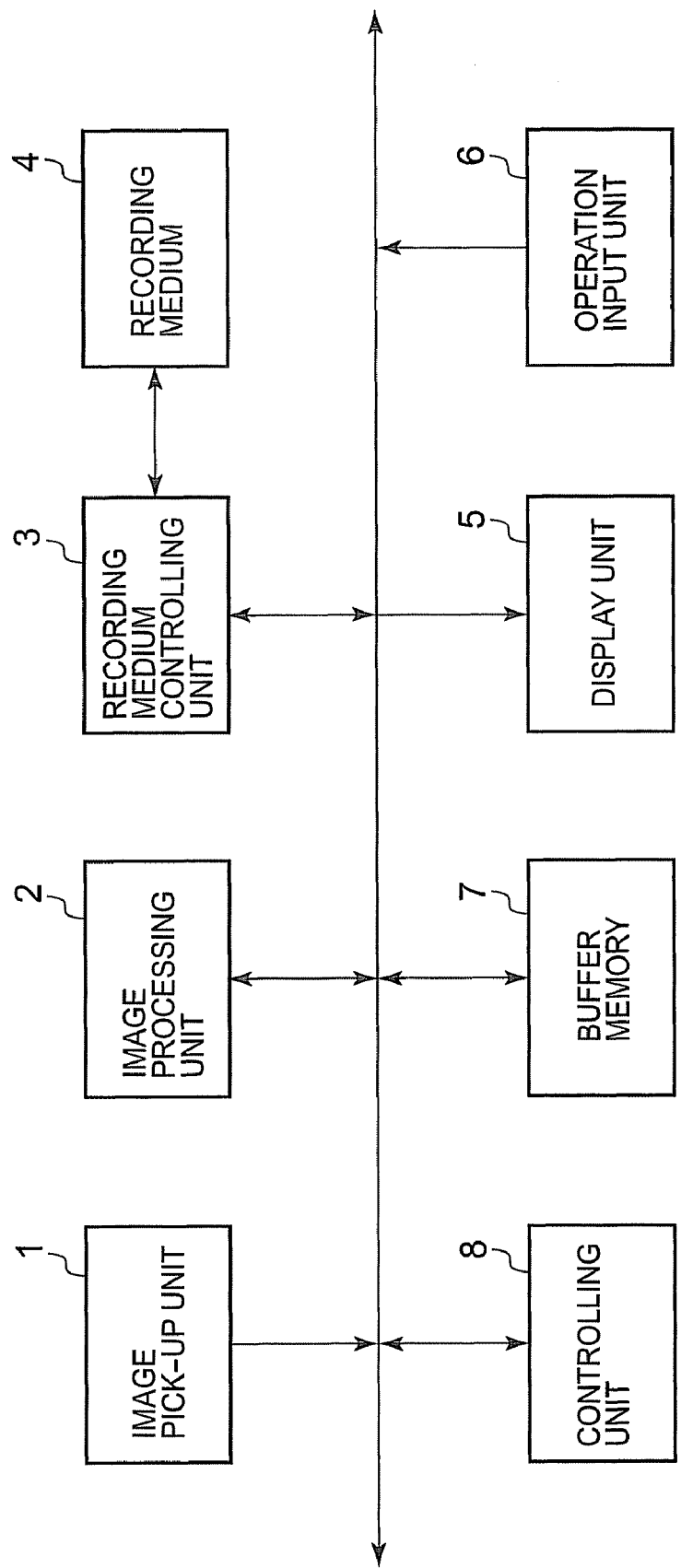
FIG. 1 is a block diagram of a circuit configuration of an image pick-up apparatus of the present invention.

Now, embodiments of the present invention will be described in detail with reference to the accompanying drawings. The scope of invention is by no means restricted to embodiments illustrated by way of example in the drawings.

FIG. 1 is a block diagram of a circuit configuration of an embodiment of an image pick-up apparatus 100 of the invention.

Figure 7:
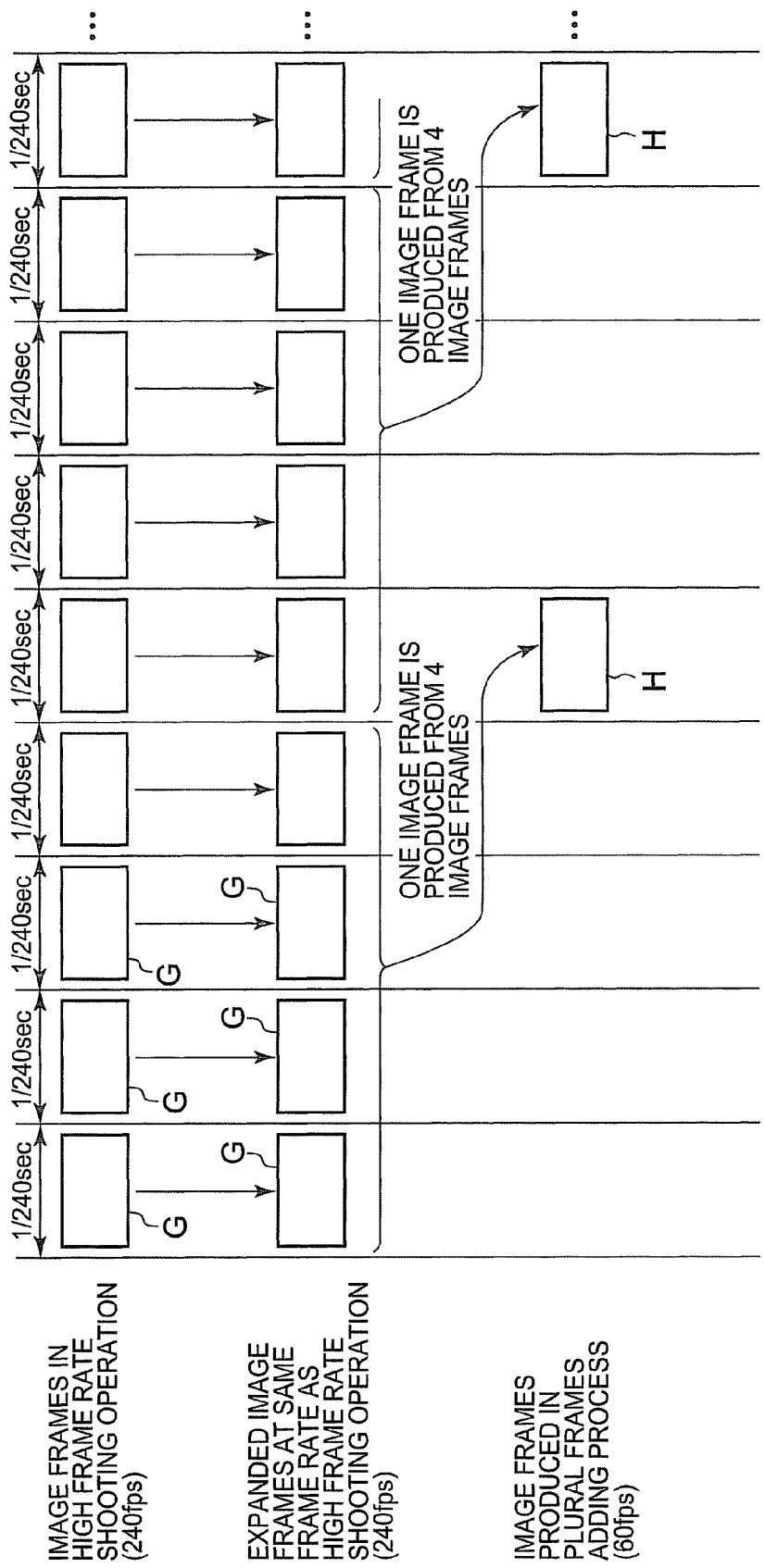
FIG. 7 is a view for explaining the normal reproducing process.

The image pick-up apparatus (moving image reproducing apparatus) 100 according to the embodiment sets the number of image frames G to be added and combined to produce a frame H for reproduction, depending on a moving image reproducing speed selected by a user (Refer to FIG. 7). The image pick-up apparatus 100 successively adds and combines the set number of image frames G to successively produce image frames H for reproduction. As shown in FIG. 1, the image pick-up apparatus 100 comprises an image pick-up unit 1, image processing unit 2, recording medium controlling unit 3, recording medium 4, display unit 5, operation input unit 6, buffer memory 7, and a controlling unit 8.

The image pick-up unit 1 continuously shoots one scene at a predetermined shooting rate, for example, at 240 fps. thereby producing plural image frames G, . . . . For example, the image pick-up unit 1 has an image pick-up lens (not shown), an electronic image pick-up unit (not shown) and a shooting control unit (not shown). The electronic image pick-up unit includes CCD (Charge Coupled Device) and/or CMOS (Complementary Metal Semiconductor), which converts an object image passing through the image pick-up lens into a two-dimensional image signal. The shooting control unit controls operation of the electronic image pick-up unit, and controls AE (automatic exposure process), AF (automatic focusing process) and AWB (automatic white balancing process). The shooting control unit makes the electronic image pick-up unit shoot with an exposure time corresponding to a predetermined shooting frame rate, and successively reads the image frames G from a shooting area of the electronic image pick-up unit at the predetermined shooting frame rate. Thereafter, the shooting control unit successively transfers and stores the read image frames G in the buffer memory 7.

In a moving image shooting process, the image processing unit 2 reads image data stored in the buffer memory 7, and performs YCbCr image producing process and an image correction process on the image data, and further performs an image compression process on the image data, thereby obtaining data in MPEG format. Further, the image processing unit 2 transfers and stores the data in MPEG format in the buffer memory 7.

When reproducing a moving image, the image processing unit 2 reads moving image data subjected to an image compression process and stored in the recording medium 4, and performs a data expansion process on the read moving image data at a predetermined frame rate, and transfers and stores the expanded data in the buffer memory 7.

Further, under control of CPU (to be described later) of the controlling unit 8, the image processing unit 2 performs a plural frames adding process every time when a predetermined frames of the expanded moving image data have been stored in the buffer memory 7. In the plural frames adding process, the image processing unit 2 adds corresponding picture elements of the predetermined number of image frames G to produce one image frame H for reproduction and adjusts brightness of the produced image frame H. The image processing unit 2 transfers and stores the processed image frame H in the buffer memory 7.

Figure 2A:
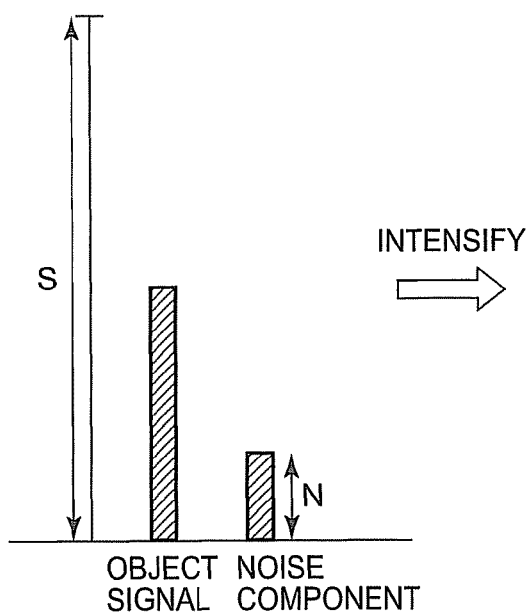
FIG. 2 is a view for explaining an intensifying process in a conventional image pick-up apparatus.
Figure 2B:
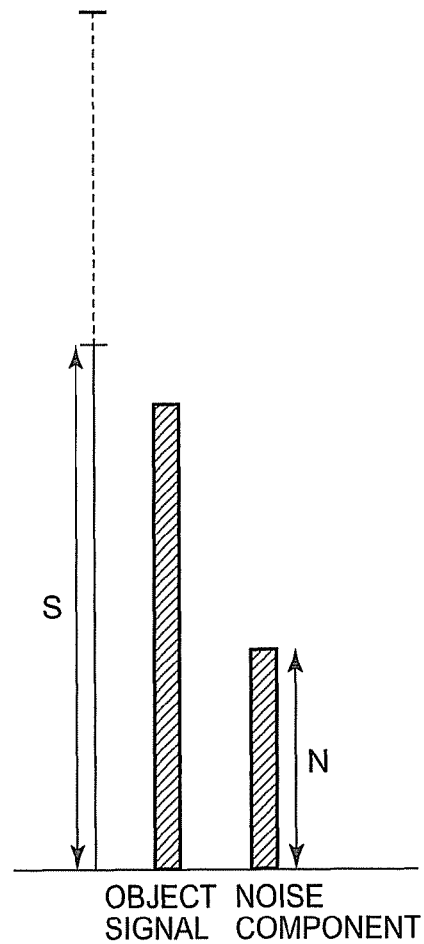
Figure 3A:
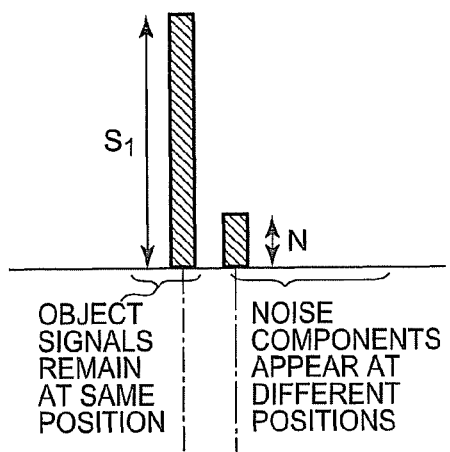
FIG. 3 is a view for explaining a plural frames adding process performed in the image pick-up apparatus of the invention.
Figure 3B:
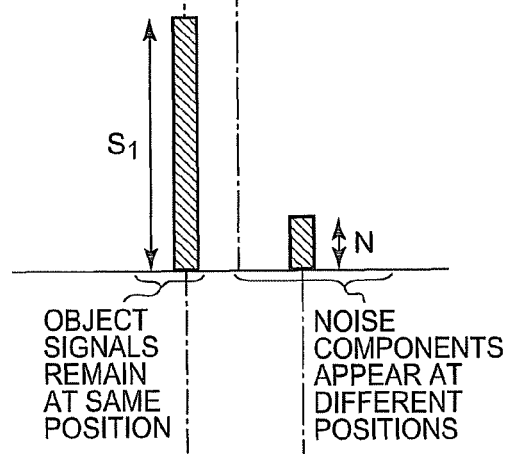
Figure 3C:
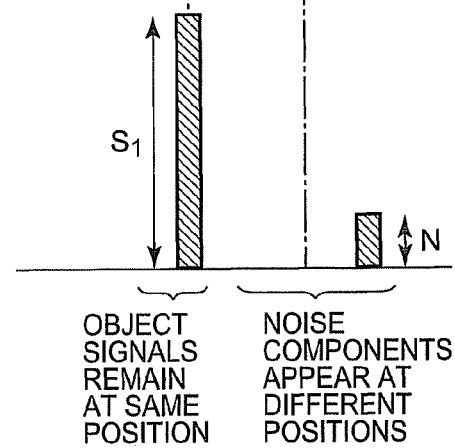
Figure 3D:
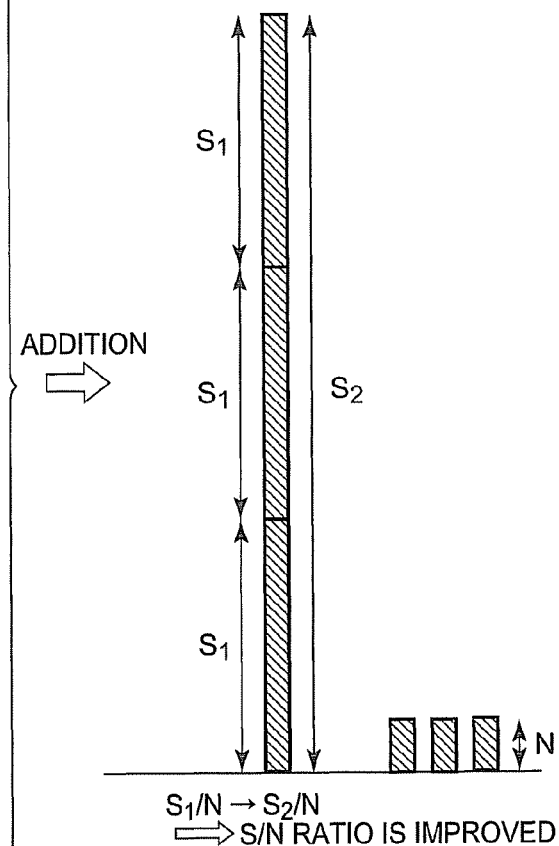

As described above, the image processing unit 2 adds and combines the predetermined number of image frames to reproduce an image (image frame H for reproduction) whose brightness has been adjusted or increased properly. Compared with an image frame which is selected from the predetermined number of image frames and subjected to an intensifying process, the image of the image frame H produced in the plural frames adding process includes less noise components. For example, the intensifying process can adjust brightness of the image frame but inevitably increases noise components of the image frame too, and S/N ratio is not improved as shown in FIG. 2. On the contrary, in the case where a predetermined number of image frames are added and combined to produce one image frame as shown at (a), (b) and (c) in FIG. 3, since object signals S1, S1 and S1 remain substantially at the same position but noise components N, N and N appear at different positions in the produced image frame as shown at (d) in FIG. 3. As the result, only the object signal S2 composed of the object signals S1, S1 and S1 increases, resulting in improving S/N ratio as shown at (d) in FIG. 3.

The image processing unit 2 and CPU serve as frame producing means and dynamic range expanding means, wherein the frame producing means adds and combines the predetermined number of image frames G to successively produce image frames H for reproduction, and the dynamic range expanding means expands the dynamic range of the produced image frames H for reproduction.

In the moving image shooting process, the recording medium controlling unit 3 performs a controlling operation that reads from the buffer memory 7 moving image data subjected to the image compression process and stores the moving image in the recording medium 4.

The recording medium 4 comprises, for instance, a non-volatile card memory (flash memory) and/or a hard disk drive. The recording medium 4 serves as storing means for storing moving image data including plural image frames G, . . . , wherein the plural image frames G, . . . have been obtained by the image pick-up unit 1, when shooting one scene at a high shooting frame rate, for example, at 240 fps.

The display unit 5 comprises a liquid crystal image displaying device (not shown) and a display controlling unit (not shown) for displaying the image frame G on the liquid crystal image displaying device. The display unit 5 successively updates at a predetermined frame rate the image frame G obtained by the image pick-up unit 1, thereby displaying a live image.

In a moving image reproducing process, under control of CPU the display unit 5 switches at a reproducing frame rate image files H successively produced in a frame producing process (to be described later), thereby reproducing a moving image.

The display unit 5 and CPU serve as reproducing means for reproducing a moving image.

The operation input unit 6 is manipulated to operate the image pick-up apparatus 100. The operation input unit 6 is provided with a shutter button, cursor buttons and a decision button, wherein the shutter button is operated for instructing the image pick-up unit 1 to record an image of an object, the cursor buttons (up and down buttons, leftward and rightward buttons) are operated to select various operation modes and items, and the decision button that is operated to decide an operation mode and/or an item selected with the cursor button.

For example, a still image shooting mode and a moving image shooting mode are prepared as the operation mode, wherein the still image shooting mode is set for shooting a still image of a predetermined size and the moving image shooting mode is for shooting a moving image at a predetermined frame rate.

When a user selects an operation mode (for example, the moving image shooting mode), an instruction for setting the operation mode is given to CPU of the controlling unit 8 through an input circuit (not shown). Upon receipt of the instruction, CPU controls operations of various units in the image pick-up apparatus 100 to perform processes appropriate for the selected operation mode.

The operation input unit 6 serves as speed specifying means for specifying a reproducing speed of a moving image.

For reproduction of a moving image, a "normal reproduction", "slow reproduction", "ultra slow reproduction" and a "fast forward reproduction" are prepared. In the normal reproduction, a moving image is reproduced at the same speed as a shooting speed at which the scene was shot. In the slow reproduction, a moving image is reproduced at a half of the shooting speed at which the scene was shot. In the ultra slow reproduction, a moving image is reproduced at a quarter of the shooting speed at which the scene was shot. In the fast forward reproduction, a moving image is reproduced at 1.5 times faster than the shooting speed at which the scene was shot. The operation input unit 6 specifies a reproducing speed of a moving image out of the above reproducing speeds.

More specifically, when the user operates the operation input unit 6 to select a reproducing speed of a moving image, the operation input unit 6 sends CPU of the controlling unit 8 an instruction of specifying the selected reproducing speed through an input circuit. Upon receipt of such instruction, CPU controls operations of various units in the image pick-up apparatus 100 to reproduce a moving image at the reproducing speed selected by the user.

The "normal reproduction", "slow reproduction", "ultra slow reproduction" and the "fast forward reproduction" are described as the reproducing speed of a moving image, but these expressions of reproduction and the reproducing speeds of a moving image are given by way of example, and are not restricted to those described above and other reproducing speed can be employed.

The buffer memory 7 comprises, for example, a flash memory, and temporarily stores data to be processed by CPU.

The controlling unit 8 serves to control operations of various units in the image pick-up apparatus 100. The controlling unit 8 is provided with CPU and a program memory (not shown).

CPU performs various control operations in accordance with programs stored in the program memory for controlling operation of the image pick-up apparatus 100.

The program memory serves to store various programs and data necessary for operation of CPU. The programs include a "frame number setting process routine", a "frame production controlling process routine" and a "reproduction controlling process routine". The routine is a part of a computer program and consists of a group of program codes having a function for performing a specific process.

The frame number setting process routine is a part of a computer program having a function of making CPU serve as frame number setting means. The frame number setting process routine includes a group of program codes for making CPU perform a frame number setting process. In the frame number setting process, the number of image frames is set in accordance with the reproducing speed of a moving image specified in response to user's operation on the operation input unit 6, which image frames are to be added and combined by the image processing unit 2 to produce a image frame H for reproduction.

More specifically, in accordance with the frame number setting process routine, CPU sets the number of image frames which are to be added and combined by the image processing unit 2 such that, even if the reproducing speed of a moving image is changed in response to user's operation on the operation input unit 6, a reproducing frame rate on the display unit 5 remains constant, for example, at a frame rate of 60 fps. For instance, when the "normal reproduction" is set to reproduce a moving image, the number of image frames G to be added and combined is set to "4", which frames have been expanded at a frame rate of 240 fps. by the image processing unit 2. When the "slow reproduction" is set to reproduce a moving image, the number of image frames G to be added and combined is set to "2", which frames have been expanded at a frame rate of 120 fps. by the image processing unit 2. And when the "ultra slow reproduction" is set to reproduce a moving image, the number of image frames G to be added and combined is set to "1", which frames have been expanded at a frame rate of 60 fps. by the image processing unit 2. Further, when the "fast forward reproduction" is set to reproduce a moving image, the number of image frames G to be added and combined is set to "6", which frames have been expanded at a frame rate of 360 fps. by the image processing unit 2.

As described above, in the case where the "ultra slow reproduction" is set to reproduce a moving image, the number of image frames G to be added and combined by the image processing unit 2 is set to "1", which means that the image frame G expanded by the image processing unit 2 is used as the image frame H for reproduction.

The number of image frames G to be added and combined in the "normal reproduction", "slow reproduction", "ultra slow reproduction", and "fast forward reproduction" is introduced by way of example, and therefore any number of image frames may be employed.

The frame production controlling process routine is a part of a computer program having a function of making CPU serve as frame producing means. The frame production controlling process routine includes a group of program codes for making CPU perform a plural frames adding process. In the plural frame adding process, the image processing unit 2 adds and combines a predetermined number of image frames G among plural image frames G, . . . stored in the recording medium 4, thereby successively producing image frames H for reproduction.

In accordance with the frame production controlling process routine, when the "normal reproduction" is set to reproduce a moving image, CPU makes the image processing unit 2 add and combine four image frames G to produce one image frame H for reproduction. When the "slow reproduction" is set to reproduce a moving image, CPU makes the image processing unit 2 add and combine two image frames G to produce one image frame H for reproduction. And when the "fast forward reproduction" is set to reproduce a moving image, CPU makes the image processing unit 2 add and combine six image frames G to produce one image frame H for reproduction.

The reproduction controlling process routine is a part of the computer program having a function for making CPU serve as reproducing means. The reproduction controlling process routine includes a group of program codes for CPU to make the image processing unit 2 perform a reproducing process which switches the successively produced image frames H at a predetermined reproducing frame rate, for example, at a frame rate of 60 fps, thereby displaying a moving image on the display unit 5.

FIGS. 4, 5, 6, 8, 9, 11, 12, 14 and 15 are flow charts for explaining whole operation of the image pick-up apparatus 100. An algorithm structure of the program stored in the program memory is indicated by these flow charts. Specific program codes for operation of CPU are not described herein, but can be written in accordance with the flow charts (algorithm structure) shown in FIGS. 4, 5, 6, 8, 9, 11, 12, 14 and 15.

A moving image shooting process will be described with reference to the flow chart of FIG. 4. The flow chart of FIG. 4 explains the moving image shooting operation of the image pick-up apparatus 100.

The image pick-up apparatus 100 according to the present embodiment of the invention performs a moving image shooting operation at a high shooting frame rate, for instance, at a frame rate of 240 fps.

Figure 4:
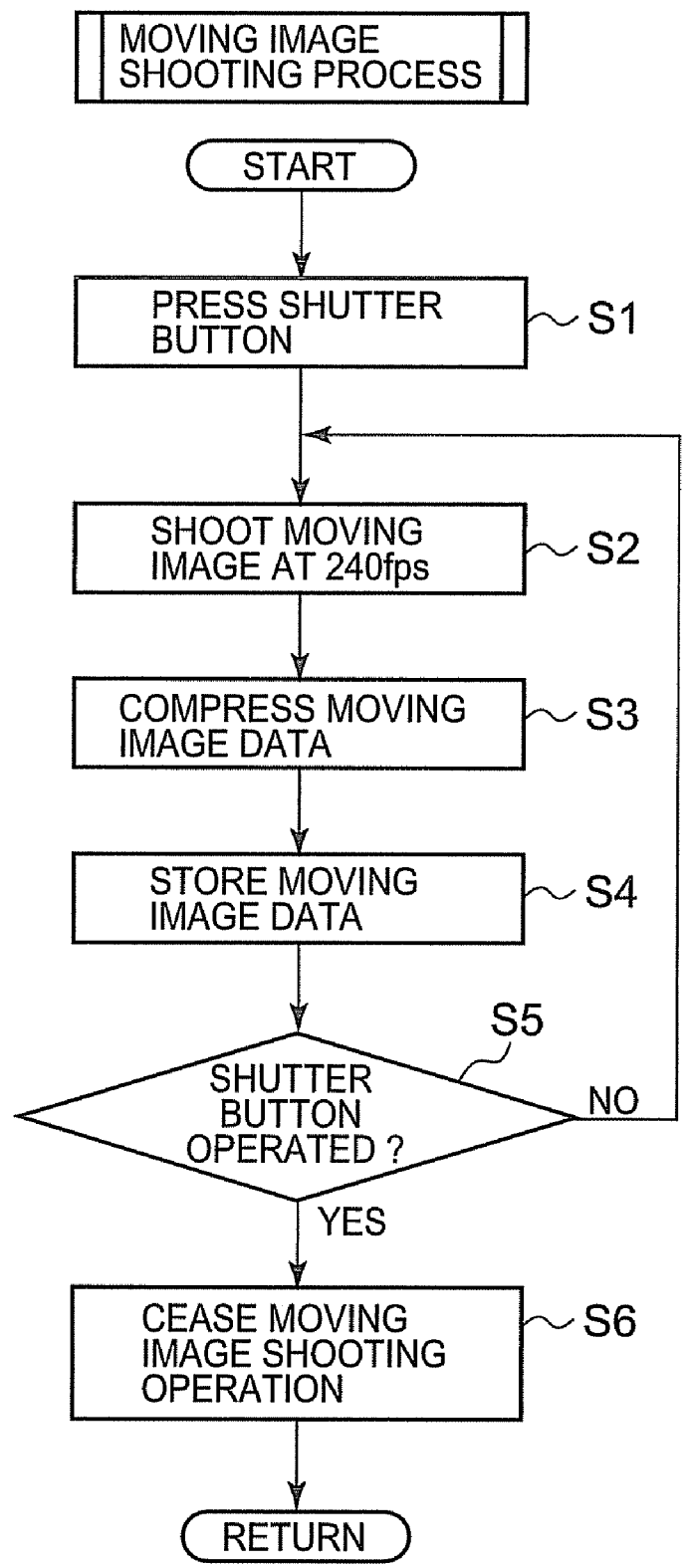
FIG. 4 is a flow chart of a moving image shooting process performed in the image pick-up apparatus of the invention.

When the shutter button is pressed by a user at step S1 in FIG. 4, CPU instructs the image pick-up unit 1, image processing unit 2 and recording medium controlling unit 3 to start the moving image shooting operation of a high frame rate (for example, at a frame rate of 240 fps.).

The image pick-up unit 1 shoots a moving image to successively produce plural image frames G, . . . , and transfers and stores the produced image frames G in the buffer memory 7 at step S2. Further, the image processing unit 2 reads the image frames G from the buffer memory 7 and performs a compression process on the data to obtain and store moving image data, for example, in MPEG format in the buffer memory 7 at step S3.

The recording medium controlling unit 3 reads the moving image data in MPEG format stored in the buffer memory 7 and stores the moving image data in the recording medium 4 at step S4.

CPU judges at step S5 whether or not the shutter button has been operated by the user, again. When the shutter button has not been operated (NO at step S5), CPU returns to step S2, and performs the processes thereafter, again.

When the shutter button has been operated, again (YES at step S5), CPU instructs the image pick-up unit 1, image processing unit 2 and recording medium controlling unit 3 to cease the moving image shooting operation at step S6.

The image pick-up unit 1 is arranged to perform an intensifying process on a moving image of an object to the minimum extent in accordance with luminance of the object during the moving image shooting operation.

For instance, when the reproducing frame rate is set to 60 fps., since a shooting operation is performed at a shooting frame rate (240 fps.) 4 times higher than the reproducing frame rate, it is necessary to increase a gain of an amplifier circuit (intensifying process) 4 times as much as at 60 fps. to obtain a moving image of sufficient luminance. But noise components and non-linear distortion can be involved in the moving image data while the gain of the amplifier circuit is increased, and therefore the gain of the amplifier circuit has to be increased to the minimum extent. In other words, when the moving image shooting operation is performed at the shooting frame rate of 240 fps., the gain of the amplifier circuit is increased to the extent that the moving image does not become black. Actual degree of the gain of an amplifier circuit may be determined by experiment.

Now, the moving image reproducing operation to be performed by the image pick-up apparatus 100 will be described in detail with reference to FIG. 5 to FIG. 16.

Figure 5:
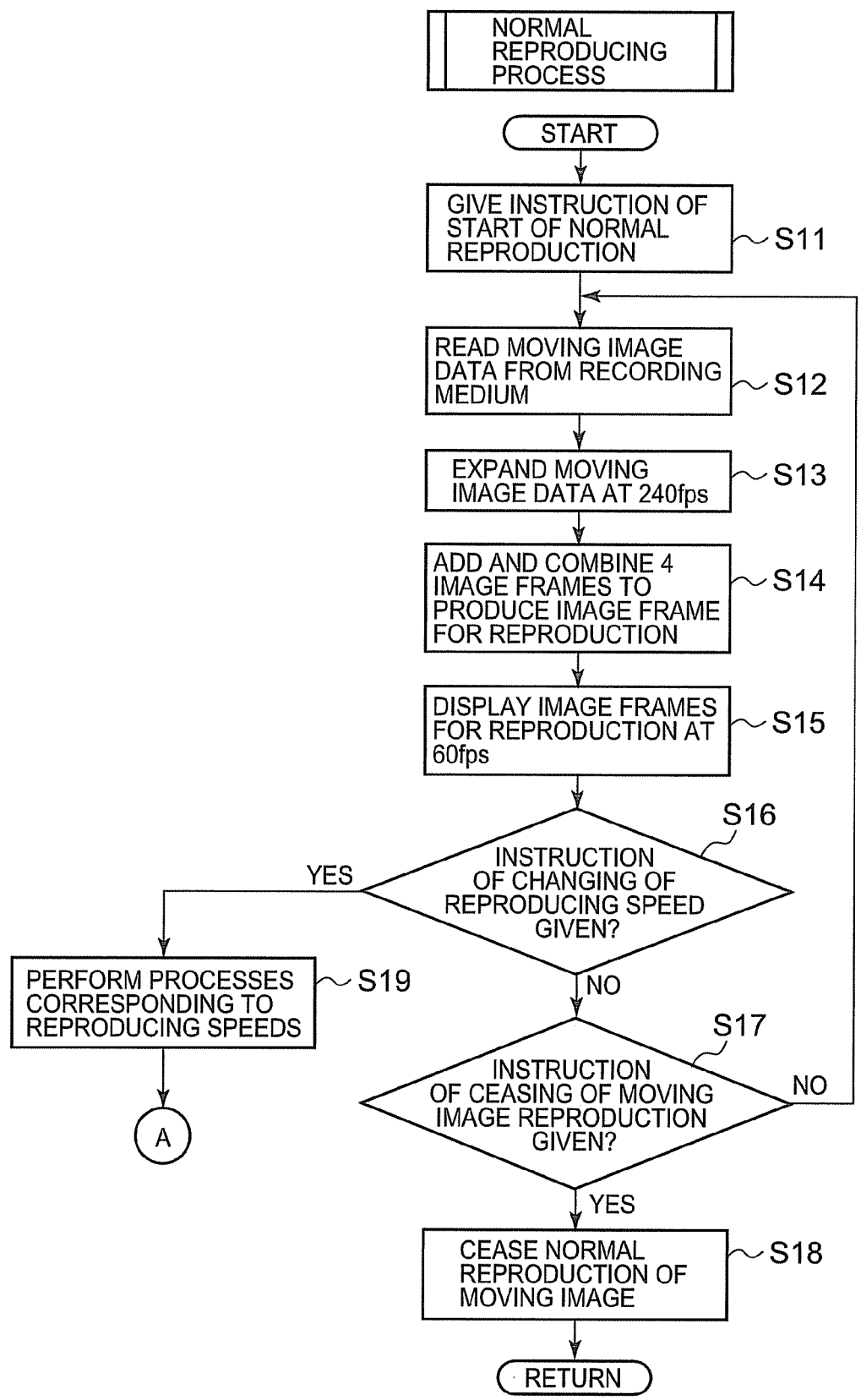
FIG. 5 is a flow chart of a normal reproducing process performed in the image pick-up apparatus of the invention.
Figure 6:
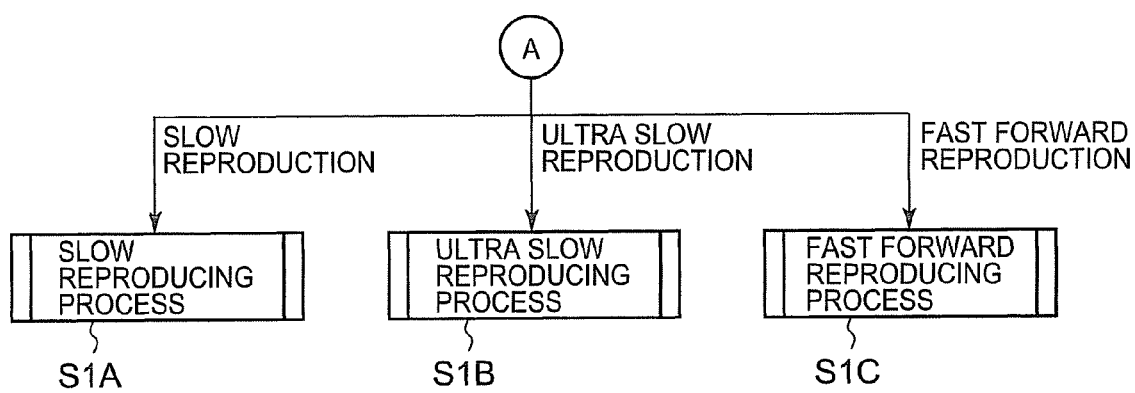
FIG. 6 is a flow chart of a normal reproducing process performed in the image pick-up apparatus of the invention.

The normal reproducing process will be described with reference to FIG. 5 to FIG. 7. FIGS. 5 and 6 are flow charts showing by way of example the normal reproducing process performed in the image pick-up apparatus 100. FIG. 7 is a view for explaining the normal reproducing process.

In the normal reproducing process, a moving image is reproduced at the same speed as actual movement of a scene shot in the shooting operation.

When an instruction of the "normal reproduction" of a moving image is given in response to user's operation on the operation input unit 6 at step S11 in FIG. 5, CPU instructs the image processing unit 2 and the recording medium controlling unit 3 to start a moving image reproducing operation of a frame rate of 240 fps. The recording medium controlling unit 3 reads from the recording medium 4 moving image data at a frame rate of 240 fps. and stores the moving image data in buffer memory 7 at step S12. The image processing unit 2 reads the moving image data stored by the recording medium controlling unit 3 and performs the data expansion process on the moving image data (compressed data) at a frame rate of 240 fps., and further transfers and stores the expanded data in buffer memory 7 at step S13 (Refer to FIG. 7).

In accordance with the frame production controlling process routine, CPU makes the image processing unit 2 add every picture element of four image frames G to produce one image frame H for reproduction every time when four image frames G of expanded moving image data have been stored in the buffer memory 7 (at step S14). The image processing unit 2 makes a luminance adjustment on the produced image frame H and transfers and stores the image frames H in the buffer memory 7.

In accordance with reproduction controlling process routine, CPU reads the image frames H for reproduction and makes a size adjustment of data to be displayed on the display unit 5 to convert a resolution of the data, and then switches the image frames H for reproduction at a frame rate of 60 fps, thereby displaying a moving image on the display unit 5 at step S15 (Refer to FIG. 7).

CPU judges at step S16 whether or not an instruction of changing of a reproducing speed of the moving image reproduction has been given in response to user's operation on the operation input unit 6. When the instruction of changing of the reproducing speed of the moving image reproduction has not been given at step S16 (NO at step S16), CPU judges at step S17 whether or not an instruction of ceasing the moving image reproduction has been given in response to user's operation on the operation input unit 6.

When the instruction of ceasing the moving image reproduction has not been given at step S17 (NO at step S17), CPU returns to step S12 and performs the processes thereafter again.

When the instruction of ceasing the moving image reproduction has been given at step S26 (YES at step S17), CPU instructs the image processing unit 2 and the recording medium controlling unit 3 to cease the normal reproduction of a moving image at step S18.

Meanwhile, when the instruction of changing of the reproducing speed of the moving image reproduction has been given in response to user's operation on the operation input unit 6 at step S16 (YES at step S16), CPU performs a process corresponding to the reproducing speed of the moving image reproduction specified in response to the user's operation at step S19 (Refer to FIG. 6).

As shown in FIG. 6, when an instruction of the "slow reproduction" of a moving image has been given, CPU performs a slow reproducing process at step S1A, and when an instruction of the "ultra slow reproduction" of a moving image has been given, CPU performs an ultra slow reproducing process at step S1B, and further when an instruction of the "fast forward reproduction" of a moving image has been given, CPU performs a fast forward reproducing process at step S1C.

Figure 8:
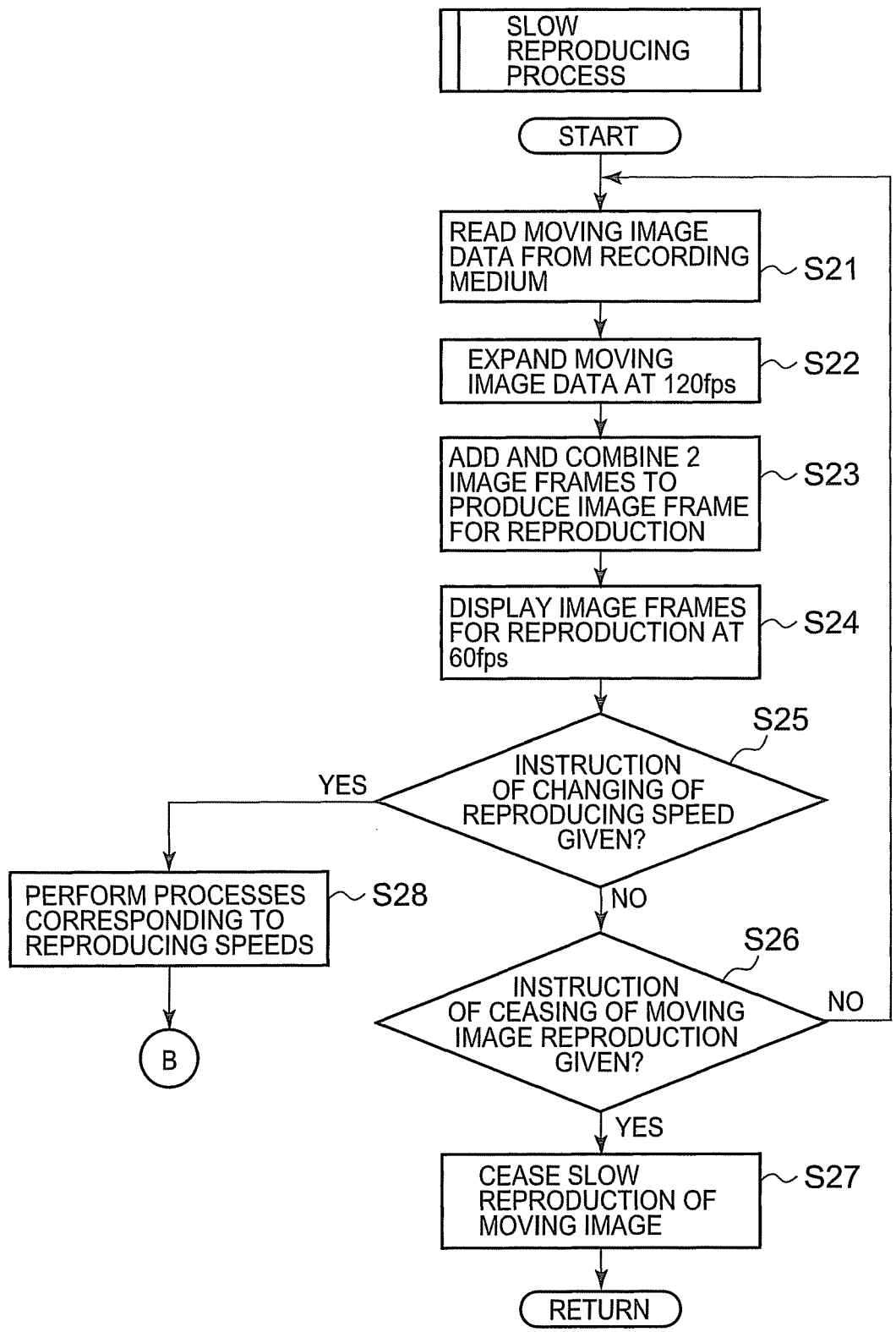
FIG. 8 is a flow chart of a slow reproducing process performed in the image pick-up apparatus of the invention.
Figure 9:
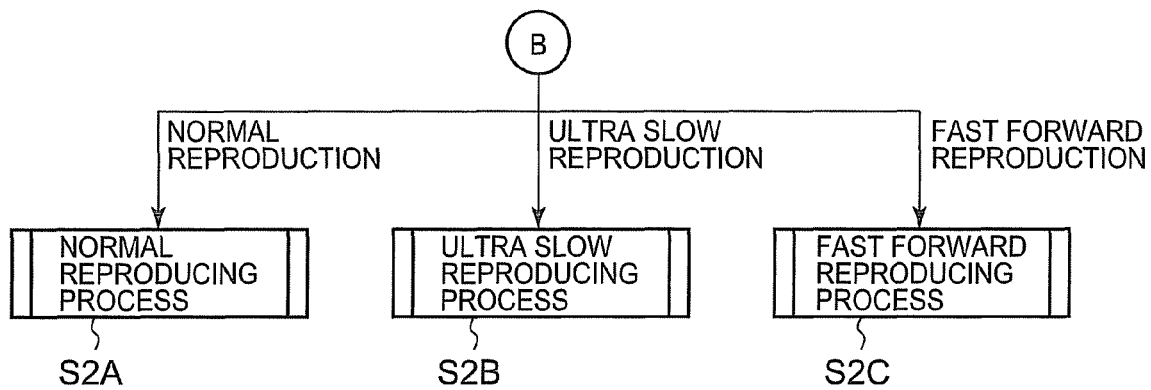
FIG. 9 is a flow chart of a slow reproducing process performed in the image pick-up apparatus of the invention.
Figure 10:
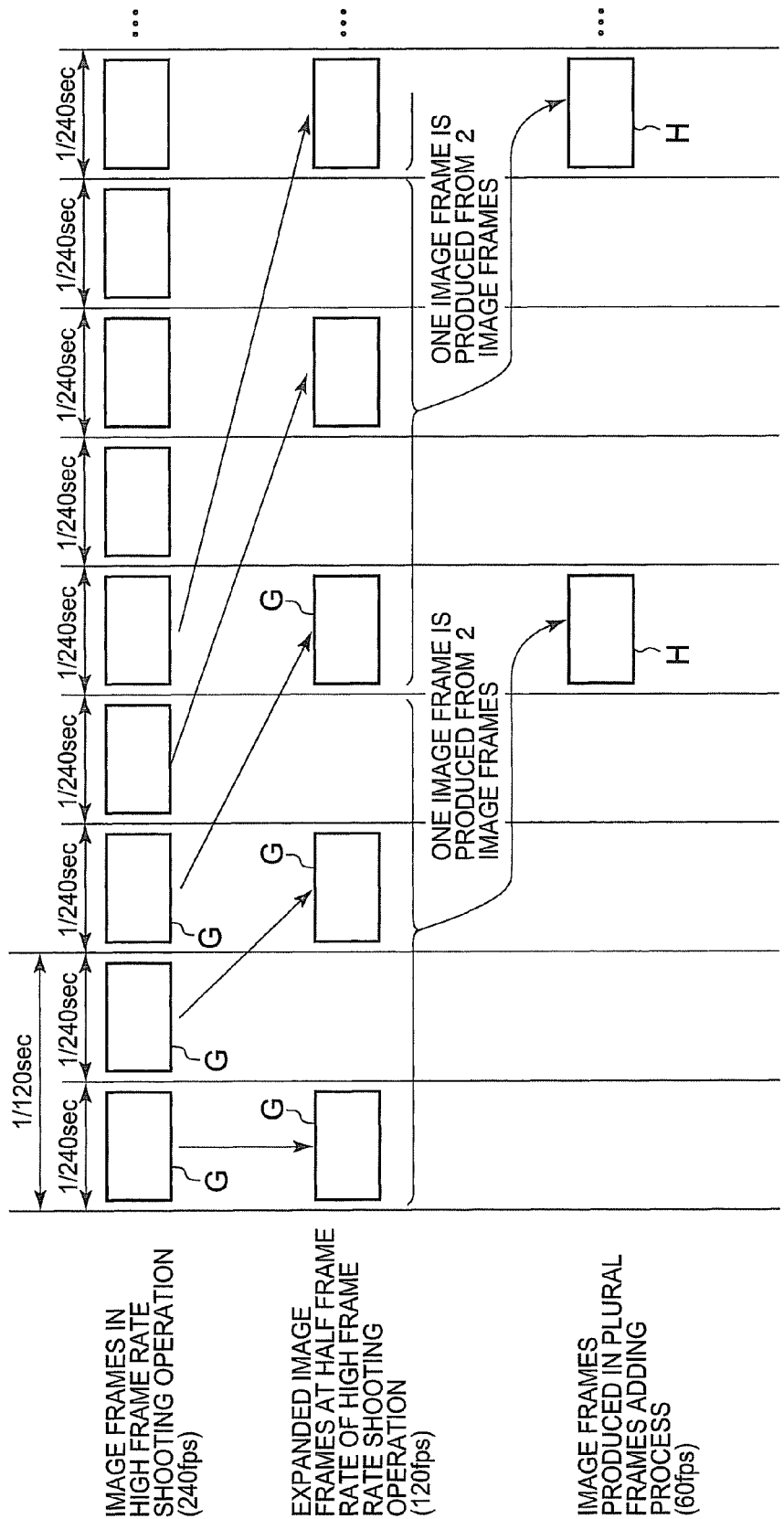
FIG. 10 is a view for explaining the slow reproducing process.

Now, the slow reproducing process to be performed at step S1A will be described with reference to FIGS. 8-10. FIGS. 8 and 9 are flow charts indicating one example of a slow reproducing operation performed by the image pick-up apparatus 100. FIG. 10 is a view for explaining the slow reproducing operation performed by the image pick-up apparatus 100.

In the slow reproducing process, a moving image is reproduced at a half speed of actual movement of the scene shot in the shooting operation.

When the instruction of the "slow reproduction" of a moving image has been given, CPU instructs the image processing unit 2 and the recording medium controlling unit 3 to start a moving image reproducing operation of a reproducing frame rate of 120 fps., wherein the reproducing frame rate of 120 fps corresponds to a half of the shooting frame rate of 240 fps. The recording medium controlling unit 3 reads the moving image data from the recording medium 4 at a frame rate of 120 fps. and stores the moving image data in the buffer memory 7 at step S21 in FIG. 8. Thereafter, the image processing unit 2 reads the moving image data stored by the recording medium controlling unit 3 and performs the image data expansion process on the moving image data (compressed image data) at a frame rate of 120 fps. and transfers and stores the expanded image data in the buffer memory 7 at step S22 (Refer to FIG. 10).

In accordance with the frame production controlling process routine, CPU makes the image processing unit 2 add every picture element of two image frames G to produce one image frame H for reproduction every time when two image frames G of expanded moving image data have been stored in the buffer memory 7 at step S23. Thereafter, the image processing unit 2 makes a luminance adjustment of the produced image frame H for reproduction, and transfers and stores the image frame H in the buffer memory 7.

In accordance with the reproduction controlling process routine, CPU reads the image frame H from the buffer memory 7 and makes a size adjustment of data to be displayed on the display unit 5 to convert a resolution of the data, and then switches the image frames H for reproduction at a frame rate of 60 fps., thereby reproducing a moving image at step S24 (Refer to FIG. 10).

CPU judges at step S25 whether or not an instruction of changing of the reproducing speed of the moving image reproduction has been given in response to user's operation on the operation input unit 6. When the instruction of changing of the reproducing speed of the moving image reproduction has not been given at step S25 (NO at step S25), CPU judges at step S26 whether or not an instruction of ceasing the moving image reproduction has been given in response to user's operation on the operation input unit 6.

When the instruction of ceasing the moving image reproduction has not been given at step S26 (NO at step S26), CPU returns to step S21 and performs the processes thereafter again.

When the instruction of ceasing the moving image reproduction has been given at step S26 (YES at step S26), CPU instructs the image processing unit 2 and the recording medium controlling unit 3 to cease the slow reproduction of a moving image at step S27.

Meanwhile, when the instruction of changing of the reproducing speed of the moving image reproduction has been given in response to user's operation on the operation input unit 6 at step S25 (YES at step S25), CPU performs a process corresponding to the reproducing speed of the moving image reproduction specified in response to the user's operation at step S28 (Refer to FIG. 9).

As shown in FIG. 9, when an instruction of the "normal reproduction" of a moving image has been given, CPU performs the normal reproducing process at step S2A, and when an instruction of the "ultra slow reproduction" of a moving image has been given, CPU performs the ultra slow reproducing process at step S2B, and further when an instruction of the "fast forward reproduction" of a moving image has been given, CPU performs the fast forward reproducing process at step S2C.

Now, with reference to FIGS. 11-13, the ultra slow reproducing process of a moving image will be described, which is to be performed by CPU at steps S1B and S2B, when an instruction of the "ultra slow reproduction" of a moving image has been given.

Figure 11:
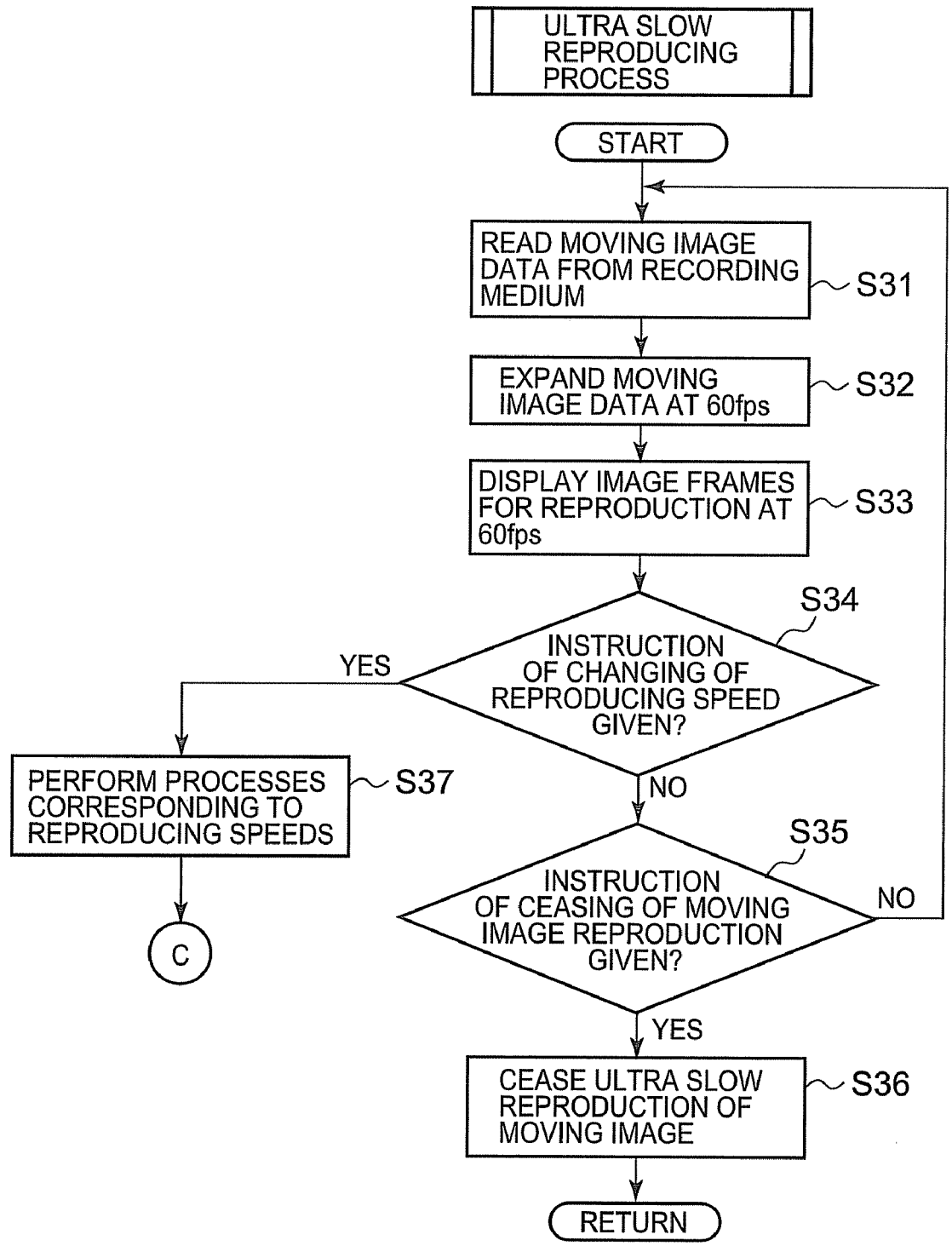
FIG. 11 is a flow chart of an ultra slow reproducing process performed in the image pick-up apparatus of the invention.
Figure 12:
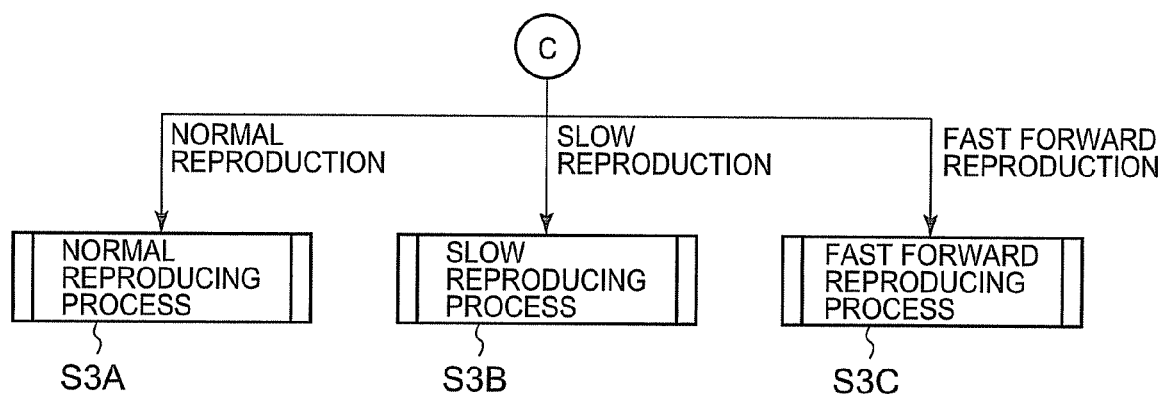
FIG. 12 is a flow chart of an ultra slow reproducing process performed in the image pick-up apparatus of the invention.
Figure 13:
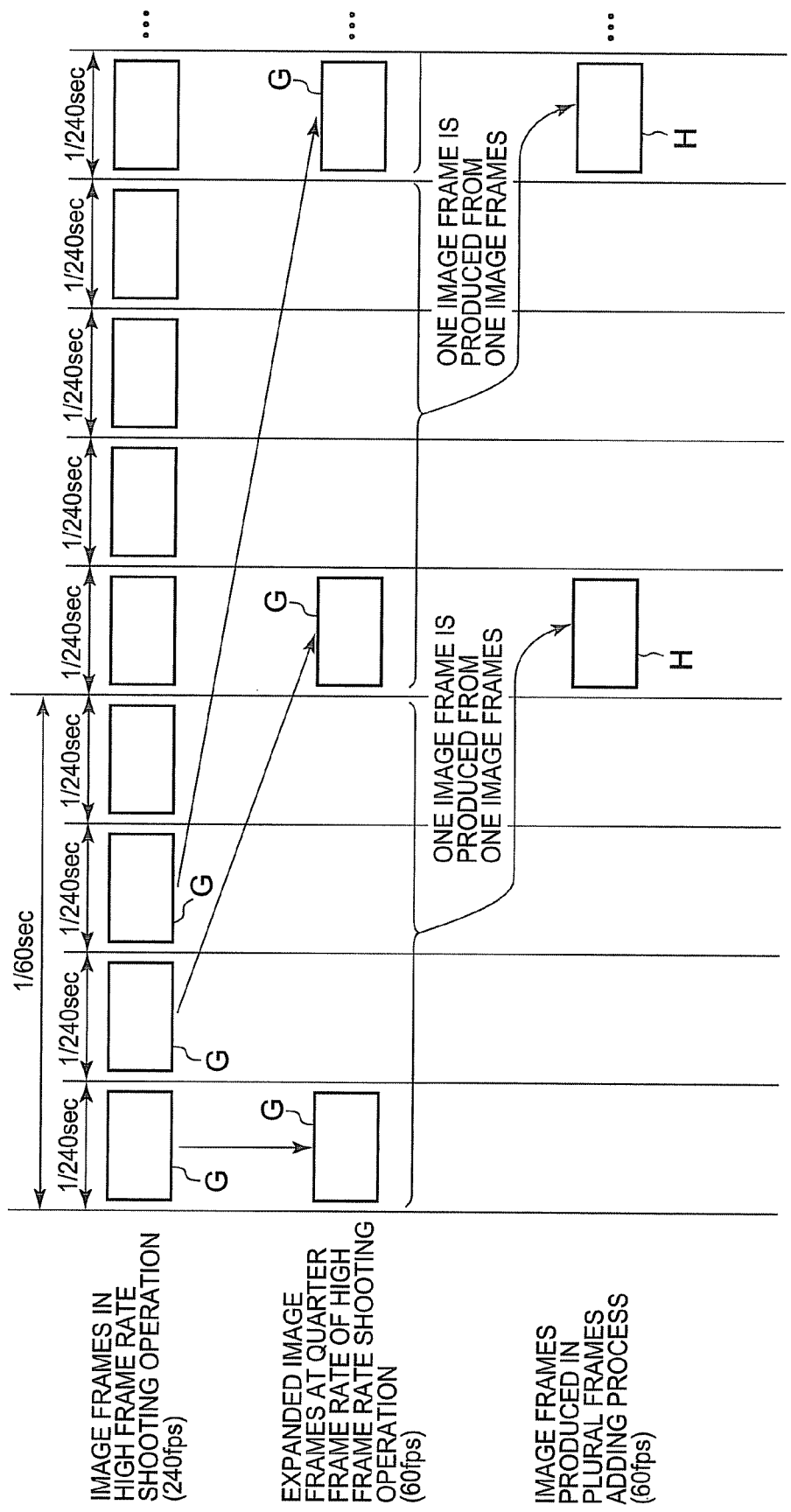
FIG. 13 is a view for explaining the ultra slow reproducing process.

FIGS. 11 and 12 are flow charts of one example of an ultra slow reproducing operation performed by the image pick-up apparatus 100. FIG. 13 is a view for explaining the ultra slow reproducing process.

In the ultra slow reproducing process, a moving image is reproduced at a quarter of the shooting speed at which the scene was shot in the shooting operation. When the instruction of the "ultra slow reproduction" of a moving image has been given, CPU instructs the image processing unit 2 and the recording medium controlling unit 3 to start a moving image reproducing operation of a reproducing frame rate of 60 fps., wherein the reproducing frame rate of 60 fps corresponds to a quarter of the shooting frame rate of 240 fps. The recording medium controlling unit 3 reads the moving image data from the recording medium 4 at a frame rate of 60 fps. and stores the moving image data in the buffer memory 7 at step S31 in FIG. 11. Thereafter, the image processing unit 2 reads the moving image data stored by the recording medium controlling unit 3 and performs the image data expansion process on the moving image data (compressed image data) at a frame rate of 60 fps. and transfers and stores the expanded image data in the buffer memory 7 at step S32 (Refer to FIG. 13).

Every time when one image frame G of expanded moving image data has been stored in the buffer memory 7, the image processing unit 2 makes a luminance adjustment on the image frame G and transfers and stores the image frame G as image frame H for reproduction in the buffer memory 7. In accordance with the reproduction controlling process routine, CPU reads the image frame H for reproduction from the buffer memory 7 and makes a size adjustment of data to be displayed on the display unit 5 to convert a resolution of the data, and then switches the image frames H for reproduction at a frame rate of 60 fps., thereby reproducing a moving image at step S33 (Refer to FIG. 13).

CPU judges at step S34 whether or not an instruction of changing of the reproducing speed of the moving image reproduction has been given in response to user's operation on the operation input unit 6. When the instruction of changing of the reproducing speed of the moving image reproduction has not been given at step S34 (NO at step S34), CPU judges at step S35 whether or not an instruction of ceasing the moving image reproduction has been given in response to user's operation on the operation input unit 6.

When the instruction of ceasing the moving image reproduction has not been given at step S35 (NO at step S35), CPU returns to step S31 and performs the processes thereafter again.

When the instruction of ceasing the moving image reproduction has been given at step S35 (YES at step S35), CPU instructs the image processing unit 2 and the recording medium controlling unit 3 to cease the ultra slow reproduction of a moving image at step S36.

Meanwhile, when the instruction of changing of the reproducing speed of the moving image reproduction has been given in response to user's operation on the operation input unit 6 at step S34 (YES at step S34), CPU performs a process corresponding to the reproducing speed of the moving image reproduction specified in response to the user's operation at step S37 (Refer to FIG. 12).

As shown in FIG. 12, when an instruction of the "normal reproduction" of a moving image has been given, CPU performs the normal reproducing process at step S3A, and when an instruction of the "slow reproduction" of a moving image has been given, CPU performs the slow reproducing process at step S3B, and further when an instruction of the "fast forward reproduction" of a moving image has been given, CPU performs the fast forward reproducing process at step S3C.

Now, with reference to FIGS. 14-16, the fast forward reproducing process of a moving image will be described, which is to be performed by CPU at steps S1C, S2C and S3C, when an instruction of the "fast forward reproduction" of a moving image has been given.

Figure 14:
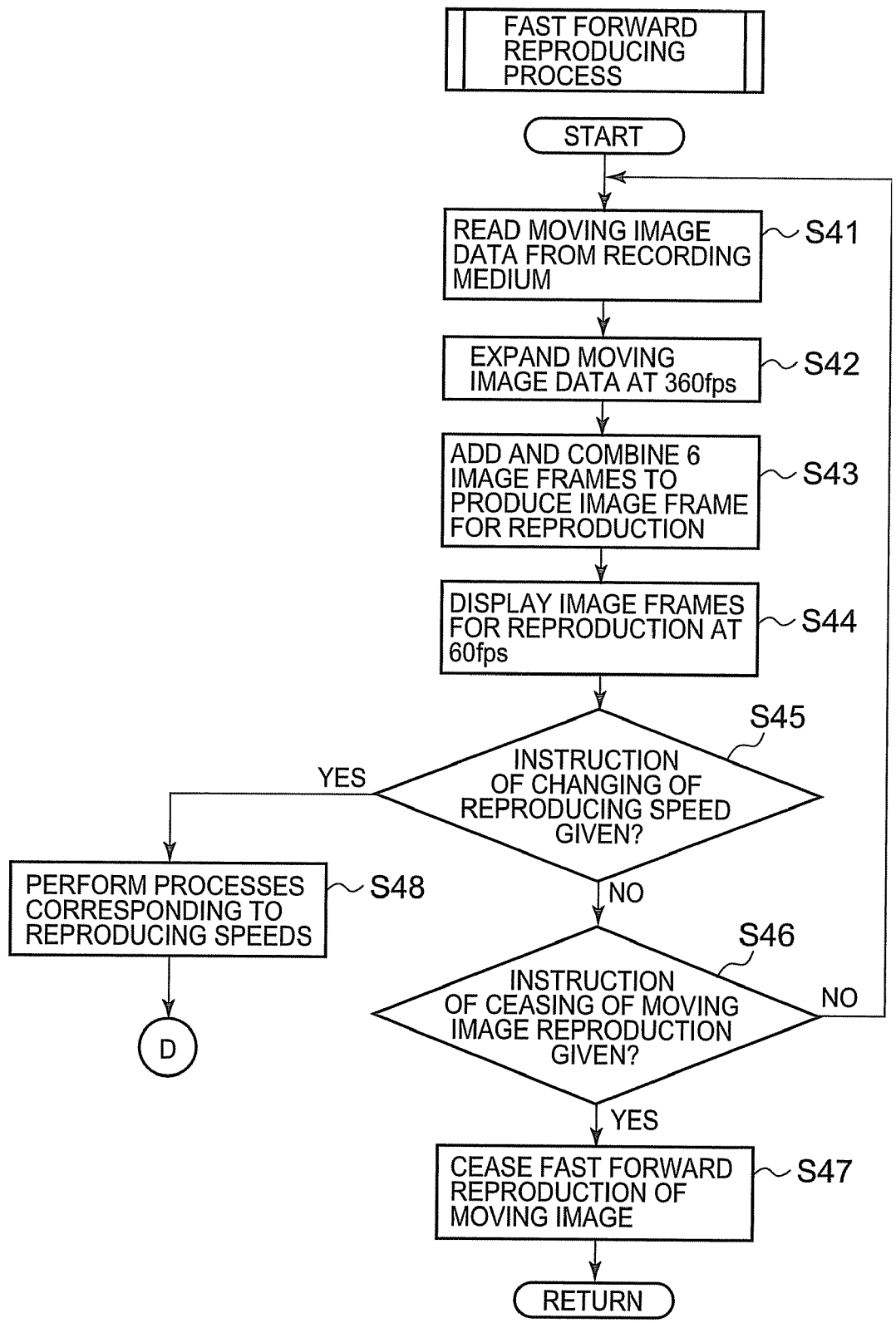
FIG. 14 is a flow chart of a fast forward reproducing process performed in the image pick-up apparatus of the invention.
Figure 15:
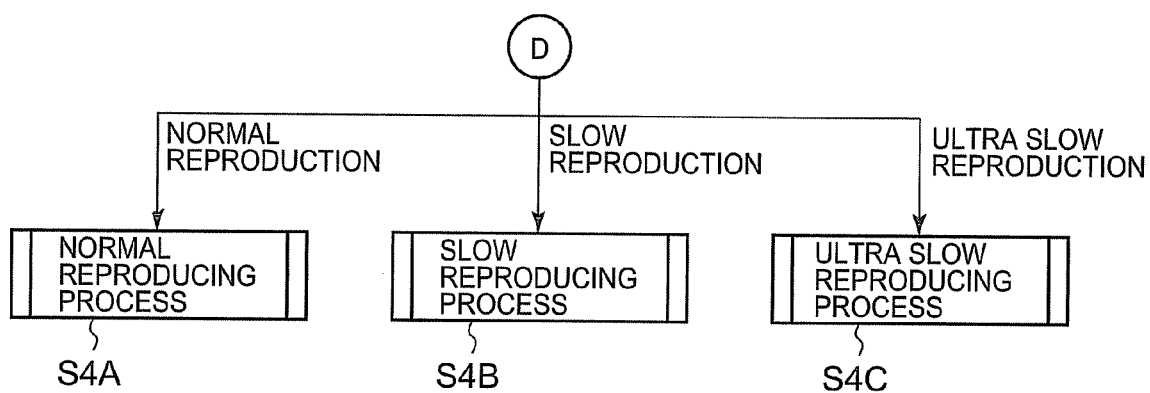
FIG. 15 is a flow chart of a fast forward reproducing process performed in the image pick-up apparatus of the invention.

FIGS. 14 and 15 are flow charts of one example of a fast forward reproducing operation performed by the image pick-up apparatus 100. FIG. 16 is a view for explaining the fast forward reproducing process.

In the fast forward reproducing process, a moving image is reproduced at a frame rate 1.5 times faster than the shooting speed at which the scene was shot in the moving image shooting operation.

When the instruction of the "fast forward reproduction" of a moving image has been given, CPU instructs the image processing unit 2 and the recording medium controlling unit 3 to start a moving image reproducing operation of a reproducing frame rate of 360 fps., wherein the reproducing frame rate of 360 fps corresponds to a frame rate 1.5 times faster than the shooting frame rate of 240 fps (Refer to FIG. 14). The recording medium controlling unit 3 reads the moving image data from the recording medium 4 at a frame rate of 360 fps. and stores the moving image data in the buffer memory 7 at step S41 in FIG. 14. Thereafter, the image processing unit 2 reads the moving image data stored by the recording medium controlling unit 3 and performs the image data expansion process on the moving image data (compressed image data) at a frame rate of 360 fps. and transfers and stores the expanded image data in the buffer memory 7 at step S42 (Refer to FIG. 16).

In accordance with the frame production controlling process routine, CPU makes the image processing unit 2 add every picture element of six image frames G to produce one image frame H for reproduction every time when six image frames G of expanded moving image data have been stored in the buffer memory 7 at step S43. Thereafter, the image processing unit 2 makes a luminance adjustment of the produced image frame H for reproduction, and transfers and stores the image frame H in the buffer memory 7.

Figure 16:
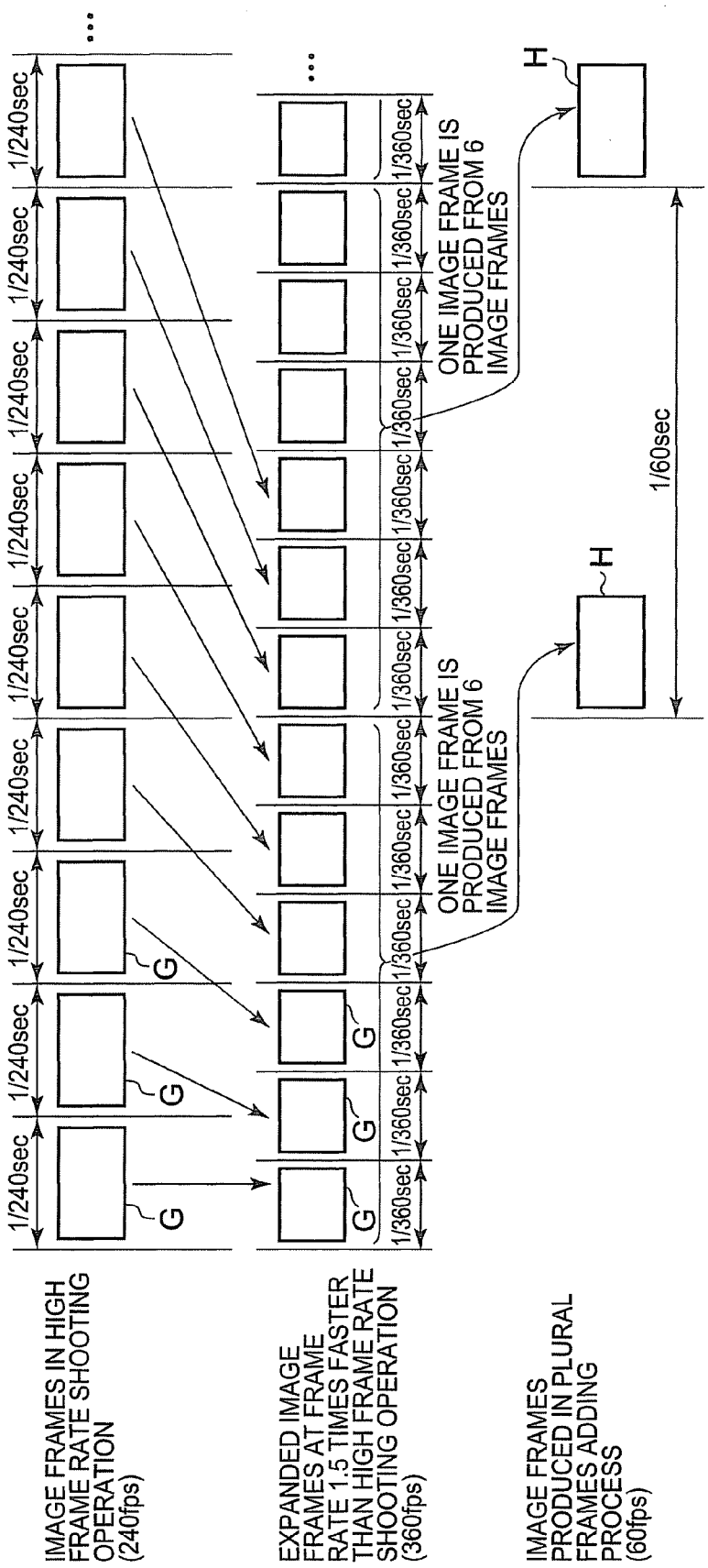
FIG. 16 is a view for explaining the fast forward reproducing process.

In accordance with the reproduction controlling process routine, CPU reads the image frame H for reproduction from the buffer memory 7 and makes a size adjustment of data to be displayed on the display unit 5 to convert a resolution of the data, and then switches the image frames H for reproduction at a frame rate of 60 fps., thereby reproducing a moving image on the display unit 5 at step S44 (Refer to FIG. 16).

CPU judges at step S45 whether or not an instruction of changing of the reproducing speed of the moving image reproduction has been given in response to user's operation on the operation input unit 6. When the instruction of changing of the reproducing speed of a moving image reproduction has not been given at step S45 (NO at step S45), CPU judges at step S46 whether or not an instruction of ceasing the moving image reproduction has been given in response to user's operation on the operation input unit 6.

When the instruction of ceasing the moving image reproduction has not been given at step S46 (NO at step S46), CPU returns to step S41 and performs the processes thereafter again.

When the instruction of ceasing the moving image reproduction has been given at step S46 (YES at step S46), CPU instructs the image processing unit 2 and the recording medium controlling unit 3 to cease the fast forward reproduction of a moving image at step S47.

Meanwhile, when an instruction of changing of the reproducing speed of the moving image reproduction has been given in response to user's operation on the operation input unit 6 at step S45 (YES at step S45), CPU performs a process corresponding to the reproducing speed of the moving image reproduction specified in response to the user's operation at step S48 (Refer to FIG. 15).

As shown in FIG. 15, when an instruction of the "normal reproduction" of a moving image has been given, CPU performs the normal reproducing process at step S4A, and when an instruction of the "slow reproduction" of a moving image has been given, CPU performs the slow reproducing process at step S4B, and further when an instruction of the "ultra slow reproduction" of a moving image has been given, CPU performs the ultra slow reproducing process at step S4C.

In the embodiment, every time when the instruction of changing of the reproducing speed of the moving image reproduction has been given at steps S16 (FIG. 5), S25 (FIG. 8), S34 (FIG. 11) and S45 (FIG. 14), CPU performs the normal reproducing process, slow reproducing process, ultra slow reproducing process, and fast forward reproducing process. The order in which these reproducing processes are performed by CPU is one example and these reproducing processes may be performed in any order.

In the image pick-up apparatus 100 described above, when the reproducing speed is specified among plural reproducing speeds in response to user's operation on the operation input unit 6, the number of image frames G is set in accordance with the specified reproducing speed, wherein the image frames G are added and combined to produce image frames H for reproduction. In other words, the number of image frames G to be added and combined by the image processing unit 2 is set such that, even if the reproducing speed of a moving image is changed in response to user's operation on the operation input unit 6, the reproducing frame rate on the display unit 5 remains constant, for example, at a frame rate of 60 fps.

For instance, when the "normal reproduction" is instructed to reproduce a moving image, the number of image frames G to be added and combined is set to "4", which frames have been expanded at a frame rate of 240 fps. by the image processing unit 2. When the "slow reproduction" is instructed to reproduce a moving image, the number of image frames G to be added and combined is set to "2", which frames have been expanded at a frame rate of 120 fps. by the image processing unit 2. And when the "ultra slow reproduction" is instructed to reproduce a moving image, the number of image frames G to be added and combined is set to "1", which frames have been expanded at a frame-rate of 60 fps. by the image processing unit 2. Further, when the "fast forward reproduction" is instructed to reproduce a moving image, the number of image frames G to be added and combined is set to "6", which frames have been expanded at a frame rate of 360 fps. by the image processing unit 2.

In the image pick-up apparatus 100, one scene is shot at a shooting frame rate higher than a reproducing frame rate, wherein image frames are successively produced, and a predetermined number of the image frames G specified in accordance with the instructed reproducing speed are added and combined by the image processing unit 2 to produce an image frame H for reproduction, and then the dynamic range of the image frame H is expanded, and a moving image is reproduced at a reproducing speed lower than the shooting frame rate. Therefore, even though the reproducing speed is changed arbitrarily, a crisp moving image is reproduced with noises properly removed.

In the fast forward reproducing process, an object shake can prominently appear in one image frame produced by an plural image frames adding process. It is preferable to detect a displacement between image frames G and make adjustment of the detected displacement before adding the image frames G.

The present invention is not restricted to the embodiments described above, and various improvements and modification in design may be made as far as they fall within the scope of the invention.

For instance, the reproducing frame rate is kept at 60 fps. on the display unit 5 in the moving image reproducing process, but is not restricted to 60 fps. The reproducing frame rate may be set to the shooting frame rate.

In other words, modification may be made to the embodiments, which allows the user to select a reproducing mode from a first reproducing mode and a second reproducing mode in response to his or her operation on the operation input unit 6 and to reproduce a moving image in the selected reproducing mode, wherein in the first reproducing mode, image frames H for reproduction produced in the plural frames adding process are switched at a predetermined frame rate, for example, at 60 fps. to reproduce a moving image at a normal reproducing speed (first reproducing speed), and in the second reproducing mode, plural image frames G, . . . , are switched at the same frame rate as the shooting frame rate, for example, at 240 fps. to reproduce a moving image at a slow reproducing speed (second reproducing speed lower than the first reproducing speed). As described, more user friendly image pick-up apparatus 100 is provided, which can reproduce a moving image more smoothly in slow motion in the second reproducing mode.

Further, in addition to the first and second reproducing modes, a third reproducing mode may be prepared in the image pick-up apparatus 100, in which reproducing mode plural image frames G, . . . , are switched at the same frame rate as the shooting frame rate, for example, at 240 fps. to reproduce a moving image at a normal reproducing speed (first reproducing speed). The user can select a reproducing mode from the first, second and third reproducing modes, operating the operation input unit 6, and reproduce a moving image in the selected reproducing mode.

As described, more user friendly image pick-up apparatus 100 is provided, which can reproduce a moving image more smoothly in slow motion in the third reproducing mode.

In the above embodiments, one reproducing speed is selected from plural reproducing speeds but a modification may be made, which allows the user to specify a reproducing speed by operating the operation input unit 6.

In the above embodiments, one reproducing speed is selected from plural reproducing speeds such that the reproducing frame rate is kept constant at 60 fps. on the display unit 5, but a modification may be made, which allows the user to specify a reproducing speed by operating the operation input unit 6.

In other words, the operation input unit 6 is operated to select a reproducing speed at which a moving image is reproduced on the display unit 5 and also used to specify a reproducing a frame rate lower than the shooting frame rate, wherein at such frame rate the image frames H for reproduction produced in the plural frames adding process are reproduced.

As described, more user friendly image pick-up apparatus 100 is provided, which can reproduce a moving image at various reproducing speeds and reproducing frame rates, thereby providing a wide variety of reproducing methods.

In the embodiments described above, the reproducing frame rate is kept constant at 60 fps. on the display unit 5, but modification may be made that reproduces a moving image while a reproducing frame rate is being decreased to a frame rate lower than the shooting frame rate when an instruction of a moving image reproduction is given. In other words, the modification that a moving image is reproduced while a frame rate is being decreased from a shooting frame rate of 240 fps. to a reproducing frame rate of 60 fps. allows a wide variety of reproducing methods and provides more user friendly image pick-up apparatus 100.

The above embodiments have been described with respect to the moving image data in MPEG format, but data in any format may be used.

In the plural frames adding process, the shooting frame rates are not converted to the reproducing frame rates, but image frames, for example, "n"th to "n+3"th image frames, "n+1"th to "n+4"th image frames, "n+2"th to "n+5"th image frames in plural continuous image frames may be added twice to produce an image frame H for reproduction, whereby the image frames H, for example, of a high reproducing frame rate of 240 fps. are produced with noise components reduced.

In this case, when an instruction of a slow reproduction of a moving image is given, an image frame between adjacent image frames H can be interpolated with the immediately adjacent image frame H.

The configuration of the image pick-up apparatus 100 is described by way of example and is by no means restricted to the embodiments described above.

The image pick-up apparatus 100 is described as a moving image reproducing apparatus, but plural pieces of image data produced by the image pick-up unit 1 may be transferred to other apparatus such as a personal computer through communication means, and the image data may be subjected to a frame number setting process, plural frames adding process, and reproducing process in the other apparatus.

In the embodiments, when the program executed, CPU serves as frame number setting means, frame producing means, and reproducing means, but logic circuits may be used to realize these functions in place of the CPU.

What is claimed is:

1. A moving image reproducing apparatus comprising:
    a storing unit for storing plural continuous image frames concerning one scene;
    a frame producing unit for subjecting, to plural-frame adding processing including addition on a pixel-to-pixel basis and subsequent brightness adjustment, a predetermined number of image frames among the plural image frames stored in the storing unit to successively produce image frames for reproduction with a noise component removed;
    a reproducing unit for switching at a predetermined reproducing frame rate the image frames for reproduction successively produced by the frame producing unit to reproduce a moving image;
    a speed specifying unit for specifying a reproducing speed at which the reproducing unit reproduces the moving image; and a frame number setting unit for setting the number of image frames to be added on a pixel-to-pixel basis by the frame producing unit in accordance with the reproducing speed specified by the speed specifying unit.

2. The moving image reproducing apparatus according to claim 1, wherein the frame number setting unit sets the number of image frames to be added and combined by the frame producing unit such that a reproducing frame rate is kept constant at which the moving image is reproduced by the reproducing unit even though another reproducing speed of the moving image is specified by the speed specifying unit.

3. The moving image reproducing apparatus according to claim 2, wherein the speed specifying unit specifies one of plural predetermined reproducing speeds.

4. The moving image reproducing apparatus according to one of claims 1-3, wherein the frame producing unit comprises:
a dynamic range expanding unit for expanding a dynamic range of the image frame for reproduction, by adding and combining a predetermined number of image frames.

5. The moving image reproducing apparatus according to one of claims 1-3, wherein
the storing unit stores plural image frames which are shot at a shooting frame rate higher than the predetermined reproducing frame rate, and
the reproducing unit reproduces the moving image at the reproducing frame rate equivalent to a frame rate that is lower than the shooting frame rate.

6. The moving image reproducing apparatus according claim 5, wherein the reproducing unit reproduces the moving image while the reproducing frame rate is decreasing to the frame rate that is lower than the shooting frame rate.

7. The moving image reproducing apparatus according to claim 1, wherein the reproducing unit is capable of reproducing the moving image in one of a first reproducing mode and a second reproducing mode, wherein in first reproducing mode, the image frames for reproductions are switched at the predetermined reproducing frame rate, whereby the moving image is reproduced at a first reproducing speed specified by the speed specifying unit, and in second reproducing mode, the plural image frames stored in the storing unit are switched at the same frame rate as the shooting frame rate, whereby the moving image is reproduced at a second reproducing speed lower than the first reproducing speed, and
the moving image reproducing apparatus, further comprising:
a selection instructing unit for instructing the reproducing unit to select one of the first reproducing mode and the second reproducing mode to reproduce the moving image.

8. The moving image reproducing apparatus according to claim 7, wherein
the reproducing unit is capable of reproducing the moving image in a third reproducing mode, wherein the plural image frame frames stored in the storing unit are switched at the same frame rate as the shooting frame rate, whereby the moving image is reproduced at the first reproducing speed, and
the selection instructing unit for instructing the reproducing unit to select one of the first reproducing mode, the second reproducing mode and the third reproducing mode to reproduce the moving image.

9. The moving image reproducing apparatus according to claim 1, wherein
the storing unit stores the plural image frames which are shot at a shooting frame rate higher than the predetermined reproducing frame rate, and the speed specifying unit specifies a reproducing speed at which the reproducing unit reproduces the moving image, and the moving image reproducing apparatus, further comprising:
a frame rate specifying unit for arbitrarily setting the predetermined reproducing frame rate to a frame rate lower than the shooting frame rate when the moving image is reproduced by the reproducing unit, wherein at such predetermined reproducing frame rate the image frames for reproduction are produced by the frame producing unit.

10. A moving image reproducing apparatus according to claim 1, wherein the frame producing means reads out a plurality of image frames stored in the storing unit and then transfers them in a buffer memory for storing the same therein, and then, after image frames of a predetermined number set by the frame number setting unit are stored, subjects the stored image frames of the set number to the plural-frame adding processing to successively produce a reproduction frame.

11. An image pick-up apparatus comprising:
an image pick-up unit for shooting one scene at a shooting frame rate to produce plural continuous image frames;
storing unit for storing the plural image frames produced by the image pick-up unit;
a frame producing unit for subjecting, to plural-frame adding processing including addition on a pixel-to-pixel basis and subsequent brightness adjustment, a predetermined number of image frames among the plural image frames stored in the storing unit to successively produce image frames for reproduction with a noise component removed;
a reproducing unit for switching at a predetermined reproducing frame rate the image frames for reproduction successively produced by the frame producing unit to reproduce a moving image;
a speed specifying unit for specifying, a reproducing speed at which the moving image is reproduced by the reproducing unit; and
a frame number setting unit for setting the number of image frames to be added on a pixel-to-pixel basis by the frame producing unit in accordance with the reproducing speed specified by speed specifying unit.

12. A computer readable non-transitory recording medium to be mounted on a moving image reproducing apparatus provided with a computer and a storing unit storing plural continuous image frames concerning one scene, the recording medium having recorded thereon a computer program when executed to make the computer function as means comprising:
frame producing means for subjecting, to plural-frame adding process including addition on a pixel-to-pixel basis and subsequent brightness adjustment, a predetermined number of image frames among the plural image frames stored in the storing unit to successively produce image frames for reproduction with a noise component removed;
reproducing means for switching at a predetermined reproducing frame rate the image frames for reproduction successively produced by the frame producing means to reproduce a moving image on a display screen of a display device; and
frame number setting means for setting the number of image frames to be added and combined by the frame producing means in accordance with a reproducing speed at which the moving image is reproduced by the reproducing means.

* * * * *